UNITED STATES PATENT OFFICE.

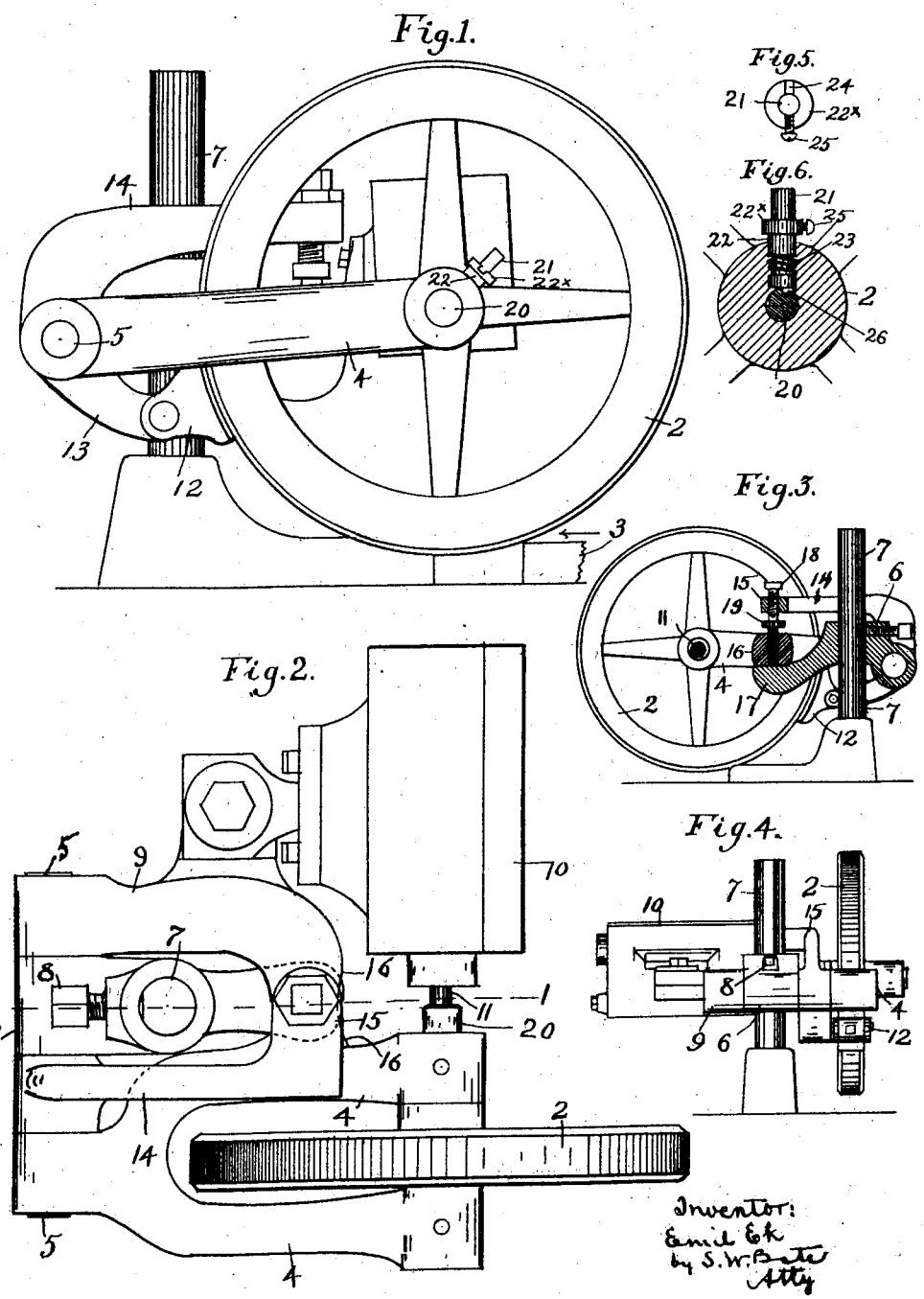

EMIL EK, OF PORTLAND, MAINE, ASSIGNOR TO ADDE & COMPANY, A CORPORATION OF MAINE.

BRAKE FOR LINEAL-MEASURING REGISTERS.

1,392,572.  Specification of Letters Patent.  Patented Oct. 4, 1921.

Application filed March 2, 1920. Serial No. 362,724.

*To all whom it may concern:*

Be it known that I, EMIL EK, a citizen of the United States, residing at Portland, in the county of Cumberland and State of Maine, have invented certain new and useful Improvements in Brakes for Lineal-Measuring Registers, of which the following is a specification.

My invention relates to meters for measuring lumber and other like material where the total length of a plurality of pieces is to be automatically measured and indicated.

My present invention is particularly designed as an improvement on the meter described and shown in my Letters Patent No. 888,599, dated May 26, 1908.

In my said meter the measuring wheel under which the lumber or other material was made to pass, was journaled on the end of an arm which was pivoted to a support so that as the lumber passed under the wheel the latter was lifted slightly and made to roll along the stick of lumber. When the wheel reached the end of the stick, if another stick did not follow closely, the wheel would drop to its lower position hanging in the air, and the momentum of the wheel and other parts of the machine would allow a considerable rotation of the wheel and the indication of lumber which had not in fact passed under the wheel. In other words, the machine would indicate more than the correct amount.

To remedy this difficulty, I arrange a fixed brake which is disposed so that as the wheel falls from the end of the stick and drops to its low position, it comes in contact with the brake and its rotation is at once checked. Thus no more lumber is indicated than actually comes in contact with the measuring wheel and the correct number of lineal feet is always indicated on the meter.

It is necessary in such measuring devices, to prevent the wheel from running backward and a pawl and ratchet mechanism is used for this purpose but it often happens that in adjusting the machine in different positions it is desirable to reverse the measuring wheel on the shaft so that the wheel will revolve in the opposite direction, reversing the meter so that the wheel will revolve in the same direction with respect to the shaft of the meter.

Another feature of my invention, therefore is to construct a pawl and ratchet mechanism which will allow the wheel to be reversed and to run in the opposite direction. I accomplish this result by forming ratchet teeth on the wheel shaft, locating in the hub of the wheel, a spring pressed pawl-bolt which may be quickly turned and made to act in the opposite direction.

I have illustrated my invention in its preferable form in the accompanying drawing in which, Figure 1 is a side elevation of my meter with brake attachment.

Fig. 2 is a plan of the same.

Fig. 3 is a section on a smaller scale taken on the line 1—1 of Fig. 2.

Fig. 4 is a rear view.

Fig. 5 is a plan of the pawl bolt and,

Fig. 6 is a section through the wheel hub showing the pawl bolt in position.

Similar reference figures indicate similar parts in the several figures of the drawing.

Referring to the drawing, 2 is the measuring wheel under which the stick of lumber 3 is designed to be fed, the wheel resting on the lumber or other stock and acting to measure the same. The wheel is journaled on the outer end of a bifurcated arm, a rear end of which is pivoted by a pin 5 to the support 6. This support 6 is held in place on a standard 7 and it is arranged to be vertically adjustable and to be secured in place by a clamping bolt 8.

On the other side of the standard, from the arm 4 which carries the wheel, is another arm 9 pivoted by its inner end to the support 6 by the pin 5 and having its forward end connect with the forward portion of the arm 4 so that the outer ends of the arms 4 and 9 form a single part and rise and fall together.

On the arm 9 is located the meter proper 10, the shaft 11, which is in line with the journal of the wheel 2 and coupled to it so that as the wheel rotates it operates the shaft of the meter and indicates the number of lineal feet which has run through.

A brake is arranged in connection with the device in such a manner that when the wheel drops from the end of a piece of stock the brake is automatically set and stops the rotation of the wheel.

As here shown, a pair of arms, 13 and 14, are connected together at their rear ends to form one member, the arms being pivoted to the support 6 by the pin 5. The arm 13 is below the support and carries at its inner end the brake 12 which acts against the surface of the friction wheel, clamping the wheel when the arms 13 and 14 are raised and releasing the wheel when these arms are lowered.

The arm 14 extends forward above the support, having an offset 15, at its inner end which is directly in front of the standard 7.

The arms 4 and 9 are united by a connecting portion 16 which rests when the wheel is not operating on a rest 17, the latter projecting forward from the support 6.

The adjustment is such that when the wheel is at its lowest point, the part 16 bears on the rest 17 and the brake is pressing against the wheel, but as soon as it begins to rise, the brake is released.

I accomplish this adjustment by means of an adjusting screw 18 which extends vertically down through the offset 15 and impinges against the head of a pin 19. This pin 19 extends vertically through the connection 16 with the lower end of the pin bearing on the rest 17 when the arms 4 and 9 are down.

The pin 19 slides freely in its recess and the head is somewhat above the upper surface of the part 16 when the arms 4 and 9 are down as shown in Fig. 3. When the wheel is in this position the adjusting screw 18 is screwed down hard enough so as to bring the brake into action. As soon as the wheel lifts however the pin 19, screw 18 and the arms 13 and 14 hold the brake in the same place and the arms 4 and 9 are allowed to rise slightly allowing the wheel to force itself from the brake. The vertical motion of the part 16 and the wheel needs to be only sufficient to release the brake and only a little allowance has to be made for the motion. When the wheel again drops it comes again into contact with the brake and is held against rotation. The screw 18 is set to clamp the brake against rotation but can be adjusted to the wear of the brake lining.

The brake may be applied to the wheel otherwise than as I have shown and this principle of checking the momentum of the friction wheel by a brake may be applied to any friction wheel whether the same runs on top of the stock or beneath the stock.

It will be seen that the arms 4 and 9 and the connecting part 16 are in effect a simple arm since they all move up and down together as the wheel rises and falls.

It is evident that my device may be used not only for lumber but for any articles of one long dimension which it is desirable to measure and it will be understood in the claims and specifications that this term is used as the equivalent of other articles of the same general nature.

In Figs. 5 and 6 I have shown in the hub of the wheel 2 the reversible bolt pawl. 20 is the wheel shaft having ratchet teeth therein and 21 is a bolt pawl having the pawl proper 26 formed on its lower end. This pawl is pressed normally against the ratchet shaft 20 by spiral spring 23, held in the space within the hub occupied by the pawl and bearing against the lower edge of the collar 22.

The collar 22 is inserted and held in the hub, the upper end of the collar having a flange $22^x$. The flange $22^x$ has a slot 24 in its upper surface extending entirely across from side to side and in this slot rests the screw 25 which enters the side of the bolt pawl 21 and holds it in position.

When the wheel is removed from the shaft 20 and reversed as it may be, under certain conditions, the bolt 21 is simply lifted until the screw leaves the slot 24 and turned around until the screw drops into the opposite slot. The pawl 26 will thus be in position to act in the same direction that it did before with respect to the shaft 20 although the wheel is turned.

The measuring wheel may be pressed into contact with the stock otherwise than by gravity and the relative position of the stock and wheel may be varied.

Whatever may be the relative position of the stock and the wheel when the former is withdrawn from contact with the wheel and resistance to such contact, then the brake comes automatically into operation to check the momentum and stop the operation of the meter.

I claim:

1. In a rotary meter for measuring lumber and other like stock, the combination of the support, an arm pivoted to said support by its rear end, a friction wheel journaled on said arm, a rotary indicating device on said arm, axially in line with said wheel and arranged to be operated by the rotation of the wheel shaft and a brake for said wheel arranged to be brought into action when the wheel is not supported by the stock.

2. In a rotary meter for measuring lumber and other like stock, the combination of a support, a wheel arm pivoted by one end to said support, a friction wheel journaled on said wheel arm, a brake arm pivoted to said support, a brake on said arm positioned to act against said wheel, an adjusting arm secured to said brake arm, a rest on said support for upholding said wheel arm, a pin passing loosely through said wheel arm and having a head above the upper surface thereof and an adjusting screw extending through said adjusting arm and impinging on the top of said pin.

3. In a rotary meter for measuring lumber and other like stock, the combination of a support, a wheel arm pivoted to said support, a standard to which said support is adjustably secured, a brake arm pivoted to said support, a brake carried on said arm and arranged to act against said wheel, an adjusting arm connecting with the said brake arm, a rest on said support for upholding said wheel arm and means connected with said adjusting arm for supporting said brake in position, to be acted upon by the downward motion of the wheel.

4. In a rotary meter for measuring lumber and other like stock, the combination of a ratchet shaft, a measuring wheel on said shaft, a spring pressed bolt pawl in the hub of the wheel, engaging said ratchet shaft, a collar through which said bolt passes, having opposite grooves in its upper edge and a pin projecting laterally from said bolt-pawl above said collar and positioned to rest in one of said grooves to regulate the acting position of said bolt-pawl.

In testimony whereof I have affixed my signature.

EMIL EK.